July 14, 1959     D. R. TOMKO     2,894,403
COIL CLUTCH MECHANISMS
Filed July 23, 1956
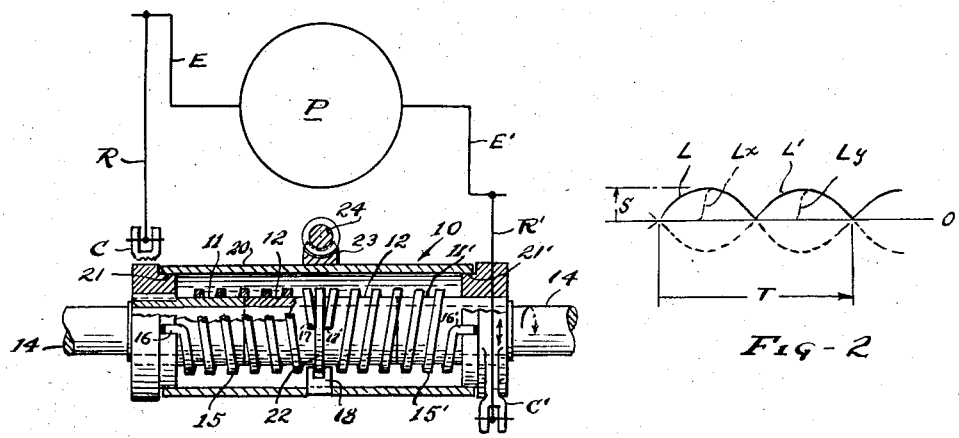
Fig. 1
Fig-2
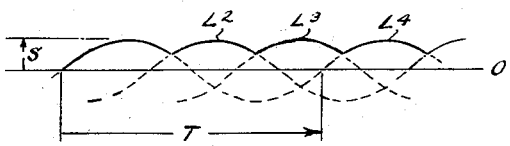
Fig 3
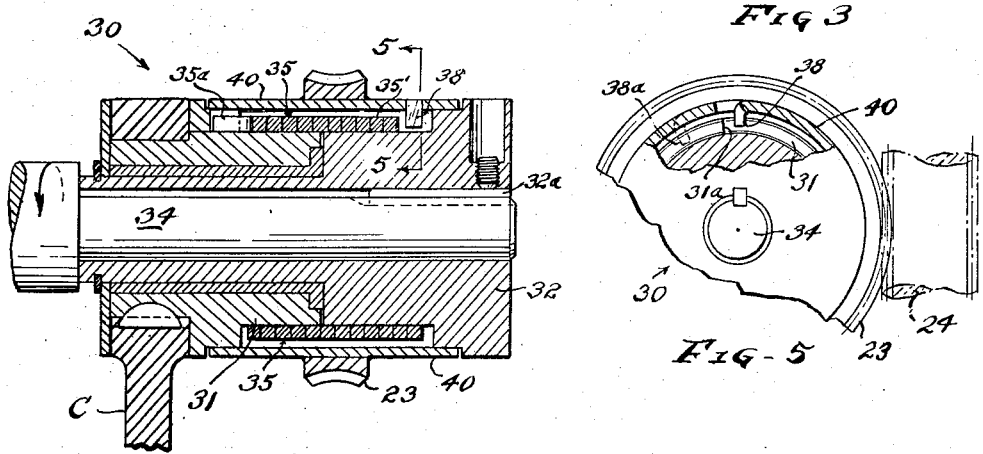
Fig-4
Fig-5
INVENTOR.
DONALD R. TOMKO
BY George M. Soule
ATTORNEY United States Patent Office 2,894,403
Patented July 14, 1959

2,894,403

COIL CLUTCH MECHANISMS

Donald R. Tomko, Cleveland, Ohio, assignor to Curtiss-Wright Corporation, New York, N.Y., a corporation of Delaware Application July 23, 1956, Serial No. 599,459

4 Claims. (Cl. 74—164)

The invention relates to an improvement in torque transmitting clutch mechanisms and particularly to such a mechanism having a reciprocating or oscillating, constant stroke, input motion and an unidirectional intermittent output motion through selectively variable angles, as about the longitudinal axis of an output shaft of the mechanism, thus indicating the general object.

A further object of the invention is to provide an improved helical friction coil or spring assembly or unit operable as an indexing mechanism, wherein input torque can be imparted to a rotary driving or input element of the clutch assembly, as by a crank or equivalent device continuously oscillated cyclically through a constant angle or stroke, and the clutch output can be adjusted, through control means acting on the helical coils for intermittent unidirectional output motion through any desired angle per input cycle, within the designed capability of the clutch mechanism, and also can be adjusted by the same control means for neutral or, in other words, zero output motion without discontinuing or modifying the input motion.

At sufficiently high input frequency (driving strokes per second), indexing coil clutches such as outlined above can be designed to serve (e.g. in place of relatively much more expensive speed reduction gearing) to produce adequately steady unidirectional rotary output motion, suitable for example in power driven tractors adapted for lawnmowing, garden cultivating and the like. The present invention, in its feature of enabling easily controlled adjustment of output amplitude per uniform input stroke from zero to any desired value, has the further object of increasing adaptability of indexing type coil or spring clutches in the above indicated field and many others.

An indexing coil or spring clutch operates as a silent ratchet; but, since the helical coil or clutch spring must be selfenergizing, it must be preloaded on its cooperating clutch drums and therefore the coil has an inherent tendency (through "overruning" friction) to produce undesired reverse motion of the ultimate output between successive indexing strokes. With average or usual loading no reverse motion is apt to occur but, in case it does, the tendency can be very effectually overcome by providing a sufficient number of indexing coils and cooperating elements so connected to the load and to the power source that the coils operate uniformly in phase with each other to block the possibility of retrograde input motion. Such connections produce increasingly steadier output motion as the number of properly phase-related clutch coils per installation is increased. In any case, with at least two clutch coils properly connected for operation in parallel, the load is equally shared between the coils and each can be designed to serve the other or others in preventing back-driving of the ultimate load in the exceptional cases such that overrunning frictional drag and its tendency to produce retrograde motion becomes important.

In the accompanying drawing Fig. 1 is a more or less schematic view showing two indexing coil clutch mechanisms in a single unit arranged for unidirectional rotation of a common output shaft. Figs. 2 and 3 are diagrams further illustrating the proposed use of plural indexing clutch mechanisms hereof. Fig. 4 is a longitudinal central sectional view of an actual physical embodiment of the present invention; and Fig. 5 is a detail or fragmentary transverse sectional view, taken as indicated by the line 5—5 on Fig. 4.

In Fig. 1, P is representative of a suitable power source or prime mover such for example as an internal combustion engine or electric motor. The output of the power source is connected as by crank or eccentric devices E and E' relatively angularly spaced at 180° to crank arms C and C' of clutch unit 10, via links or rods R and R', so that crank arms C and C' are oscillated through equal angles alternately, each performing a forward or indexing stroke when the other performs its return stroke.

The clutch unit 10, as diagramatically shown, has two input clutch drums 11 and 11' secured to respective crank arms C and C' and a single output clutch drum 12 coaxial with the input clutch drums and rigid with an output shaft 14 shown as extending axially through the unit 10 and on which the input drums 11 and 11' may be journaled for free rotation relative to the output shaft and relative to each other. The two ends of shaft 14 (not shown) are assumed to be connected to the ultimate load, e.g. traction wheels. Helical clutch coils or clutch springs 15 and 15' (shown openly wound solely for emphasis of the fact that the coils are of relatively opposite "hand" or coiling) are operatively anchored at their relatively remote ends, as by axial toes 16 and 16', to the hub portions of respective crank arms C and C'. The relatively adjacent "free ends" of the coils 15 and 15' are preloaded for self energization on respective portions of the output drum 12. The coils which surround the input drums 11 and 11' preferably have the same preloading on those drums. The terminal faces 17 and 17' of the free end coils form release shoulders for the coils.

For effecting output index stroke adjustment of the clutch mechanism, hence its net output speed, a control sleeve 20 surrounds the coil assembly and may be supported by circular shoulder surface portions 21 and 21' on the hub portions of crank arms C and C'. The control sleeve has a radially inwardly extending abutment 18 in the transverse plane of the coil end faces 17 and 17' for coil-releasing contact with said faces. The free end coils which normally grip the drum 12 are shown spaced apart by a peripheral rib 22 on the output drum 12, and the abutment 18 is shown slotted so as to straddle the rib 22 for contact with the coil end faces. The control sleeve 20 is normally stationary, wherefore at any time prior to or during operation of the clutch mechanism, the sleeve can easily be adjusted about the longitudinal axis of the clutch assembly and relative to the clutch coils and the drums.

While any suitable means can be employed to effect adjustment or setting of control sleeve 20 and maintenance of adjustment, the sleeve 20 is indicated to be at least partially encircled by worm teeth 23 in mesh with a rotary adjusting worm 24 supported in axially fixed position adjacent to the control sleeve 20 by suitable means not shown.

During operation when the sleeve is adjusted for less than maximum indexing stroke the two clutch coils 15 and 15' are expanded out of contact with their coacting drums once for each complete input cycle. Therefore the control sleeve 20 is made adequately larger on its inside diameter than the outside diameter of the coils 15 and 15' as preloaded on their coacting drums so that the coils will never be expanded into contact with the interior of the control sleeve. The operating linkage is so designed that drum-gripping by clutch coil or spring 15 is interrupted by return motion of its associated crank arm C at the instant clutch coil or spring 15' is caused to commence to grip its drums by forward motion of crank arm C'.

In operation, assume first that the control sleeve 20 is so adjusted and locked by the worm 24 or its equivalent that the two crank arms C and C' can perform their entire throw or active-clutch-input motions without causing the spring end faces 17 and 17' to come into contact with the release shoulder 18 of the control sleeve 20. Thereby the assembly is set for maximum output amplitude or indexing angular motion per input stroke or in other words for maximum output speed of the mechanism via shaft 14. Now, during continued operation of the mechanism the effective indexing strokes of the crank arms can be shortened to any desired point thus permitting the net output speed to be varied between maximum and zero (neutral), by adjusting the control sleeve 20 to bring the release shoulder 18 relatively toward the oncoming coil end faces or shoulders 17 and 17'. The release shoulder 18 alternately engages the coil end faces 17 and 17' during the active strokes of the coil-connected crank arms C and C', causing the clutch coils to expand and release the output drum 12 (and, incidentally, the respective input drums) during whatever portion remains of each active crank arm stroke. In other words the mechanism causes reduction of the clutching phase of each crank cycle by a predetermined amount according to the setting of shoulder 18.

In the diagram, Fig. 2, showing a typical operational time vs. speed rate pattern (when input motion is imparted by cranks as schematically represented in Fig. 1), horizontal line 0 represents zero speed, the curved solid lines L and L' indicate full cycle indexing by a dual indexing clutch such as shown by Fig. 1, the inactive portions of the cycles being shown by dotted continuations of lines L and L'. It is apparent that no output retrograde motion would be possible at full speed operation. At half speed setting the performance would be something like L, Lx and L', Ly Fig. 2. Thus any low speed setting by a dual clutch installation produces a series of dwell periods of some length between indexing or forward motions.

In case of using a single variable index clutch hereof in an installation, or in order to block retrograde motion of the output during dwell periods such as just above mentioned, a simple one way overrunning or "no-back" self energizing coil (not shown) can be connected for example to the output shaft (e.g. 14).

Figs. 4 and 5 show a clutch assembly 30 having an input or driving drum 31 connected to a fixed throw crank C; an output or driven drum 32 connected, as by key 32a, to an output shaft 34, and helical coil 35 with free end coils 35' suitably preloaded on the output clutch drum. The coil 35 is shown anchored to the input drum 31 for turning therewith as by a toe portion 35a of the coil. For control of the coil 35 a radially inwardly extending clutch coil release tab or tang 38 is supported on an angularly adjustable sleeve 40 surrounding and radially spaced from the coil 35. The sleeve 40 is suitably supported for rotational adjustment as in the case of sleeve 20 of Fig. 1. The coil 35 grips the drums during forward or indexing motion of the crank C and is released and expanded as a function of the angular adjustment of the sleeve 40 and tab 38 through a range less than the designed angular movement or throw of the crank C.

Three properly phase related coil or spring clutch assemblies hereof (three not shown, but each being assumed to be essentially like unit 30 of Figs. 4 and 5) having respective operating cranks such as E, Fig. 1, angularly spaced 120° apart about their common axis of rotation, and whose output drums 32 are connected to a common shaft or load, will produce an output motion pattern approximately as illustrated by the relatively overlapping curved lines L², L³ and L⁴, Fig. 3. The continuous or "solid" portions of said lines L², L³ and L⁴ represent the successive indexing actions of the respective clutch units and the dotted lines represent temporary inaction of the various units. For example during the time interval depicted by the solid portion of line L³, only the unit represented by line L³ would be indexing whereas during that interval the coils 35' of the other two units would be overrunning relative to their associated output drums 32. It is apparent that such an installation comprising three clutch units acting in parallel and in phase as just above described produces a more uniform net forward motion that can be produced by the arrangement according to Fig. 1 hereof and with substantially no possibility of retrograde or reverse output motion even at relatively low speed settings.

I claim:

1. An overrunning indexing coil clutch mechanism including coaxially arranged relatively adjacent and rotatable input and output members, the output member being a circular clutch drum, helical coil spring attached to the input member to turn therewith and having an end coil portion elastically preloaded against the output drum member and otherwise unconnected therewith, means capable of imparting cyclic oscillating movement to the input member, and normally stationary or non-rotating means capable of adjustment during cyclic movement of the input member and operable as a function of adjustment variably to cause intermittent release of said end coil portions from the output drum member on successive input cycles.

2. An indexing coil or spring clutch mechanism having a coil connected to turn with a continuously and uniformly oscillating input member coaxial with the coil, said coil being elastically preloaded for self energizing gripping action on an output drum member coaxial with the coil and otherwise unconnected with the output drum member; further characterized by provision of a normally stationary control member having a coil-deenergizing element mounted for angular movement about the axis of the coil and capable of acting on the coil to cause it to release its grip on the output drum member in a plurality of selected positions such as to cause the angular motion of the output drum member to be less than the angular movement of the input member, and means connected with the control member for adjusting its angular position.

3. The mechanism according to claim 2, wherein the control member is an abutment carried by a normally stationary sleeve surrounding the coil, means to support the sleeve on the clutch mechanism for rotational adjustment of the abutment, said abutment being arranged for contact with a shoulder on an end portion of the coil disposed circumferentially of the coil.

4. An indexing clutch mechanism comprising a plurality of coaxial rotary input members, means to cause said members to be oscillated cyclically in uniform phase relationship with each other, a rotary output member coaxial with the input members and having output clutch drum surfaces connected to turn therewith, a helical clutch coil for each of the input members connected respectively to turn therewith at all times, the coils having free end portions preloaded for self energizing one-waygripping and one-way-overrunning contact with respective output clutch drum surfaces and otherwise unconnected therewith, and a normally stationary coil-controlling device readily adjustable during indexing operation of the mechanism and having coil control shoulders selectively positionable circumferentially of the coils and disposed in the path of movement of terminal shoulders on the free end portions of respective coils so as to release those portions from gripping relationship with their associated output drum surfaces at relatively different portions of the input cycles as determined by the selective positioning of the control shoulders.

References Cited in the file of this patent

UNITED STATES PATENTS

| | | |
|---|---|---|
| 2,551,739 | Harlan | May 8, 1951 |
| 2,595,213 | Raynor | Apr. 29, 1952 |

FOREIGN PATENTS

| | | |
|---|---|---|
| 236,592 | Great Britain | July 6, 1925 |
| 259,132 | Germany | Apr. 25, 1913 |
| 473,150 | Canada | Apr. 24, 1951 |
| 604,209 | France | Apr. 30, 1926 |